US012717775B1

(12) United States Patent
Majerowicz

(10) Patent No.: US 12,717,775 B1
(45) Date of Patent: Aug. 25, 2026

(54) SYSTEM, METHOD, AND COMPUTER PROGRAM FOR ENHANCED TWO-PHASE COMMIT PROTOCOL WITH PARTICIPANT INTERDEPENDENCIES

(71) Applicant: Amdocs Development Limited, Limassol (CY)

(72) Inventor: Lucas Dario Majerowicz, Herzlyia (IL)

(73) Assignee: AMDOCS DEVELOPMENT LIMITED

( * ) Notice: Subject to any disclaimer, the term of this patent is extended or adjusted under 35 U.S.C. 154(b) by 1 day.

(21) Appl. No.: 19/047,326

(22) Filed: Feb. 6, 2025

(51) Int. Cl.
*G06F 16/23* (2019.01)

(52) U.S. Cl.
CPC ................................ *G06F 16/2379* (2019.01)

(58) Field of Classification Search
CPC .................................................. G06F 16/2379
See application file for complete search history.

(56) References Cited

U.S. PATENT DOCUMENTS 8,606,947 B2 * 12/2013 Hawkes ................. G06F 9/466 707/613
2007/0168351 A1 * 7/2007 Fachan ............... G06F 16/1865
2015/0269185 A1 * 9/2015 Fang ....................... G06F 16/00 707/703
2016/0232178 A1 * 8/2016 Little ...................... G06F 9/466
2018/0107703 A1 * 4/2018 Sharp .................. G06F 16/2365
2020/0401575 A1 * 12/2020 Olstad ................ G06F 16/2343
2022/0138164 A1 * 5/2022 Brahma Raju ..... G06F 16/1865 707/675
2022/0138177 A1 * 5/2022 Raju .................. G06F 11/2094 707/703
2023/0367749 A1 * 11/2023 Xiong ................... G06F 3/0647
2026/0003993 A1 * 1/2026 Kharatishvili ...... G06F 21/6227

* cited by examiner

*Primary Examiner* — Maher N Algibhah
(74) *Attorney, Agent, or Firm* — Zilka-Kotab, P.C.

(57) ABSTRACT

As described herein, a system, method, and computer program are provided for enhanced two-phase commit protocol with participant interdependencies. In use, a two-phase commit protocol for a distributed transaction involving multiple participants is initiated. A prepare request from a coordinator is received at a first participant. A confirmation message indicating completion of a preparation stage is sent from the first participant to other participants. The confirmation message from the first participant is received at a second participant. In response to receiving the confirmation message, transaction-related data is retrieved by the second participant from the first participant using a transaction identifier. A preparation stage is completed by the second participant using the retrieved transaction-related data. A vote indicating readiness to commit the transaction is sent from the second participant to the coordinator.

20 Claims, 10 Drawing Sheets

SYSTEM, METHOD, AND COMPUTER PROGRAM FOR ENHANCED TWO-PHASE COMMIT PROTOCOL WITH PARTICIPANT INTERDEPENDENCIES

FIELD OF THE INVENTION

The present invention relates to distributed transaction processing systems.

BACKGROUND

The field of distributed computing faces a significant challenge in maintaining data consistency across multiple services or nodes while allowing for complex inter-service dependencies. This issue has become increasingly important due to the growing complexity of distributed systems and the need for real-time, interdependent operations across various services.

Existing systems attempting to address this problem encounter several obstacles. These include the inability to handle dependencies between participants in distributed transactions, limited access to uncommitted data during transaction preparation, and difficulties in maintaining consistency when services have complex interdependencies. These challenges limit the effectiveness of current distributed transaction protocols, particularly in scenarios where one service requires data from another service to complete its part of the transaction.

For instance, in e-commerce platforms, current solutions fail to efficiently manage inventory, order processing, and payment systems concurrently while ensuring consistency across all services. Another example is in financial institutions, where existing methods are unable to maintain data integrity across various interdependent services, such as account management and fraud detection, in real-time transaction processing. These shortcomings often lead to increased transaction times, reduced system reliability, and potential data inconsistencies in complex distributed environments.

There is thus a need for addressing these and/or other issues associated with the prior art.

SUMMARY

As described herein, a system, method, and computer program are provided for enhanced two-phase commit protocol with participant interdependencies. In use, a two-phase commit protocol for a distributed transaction involving multiple participants is initiated. A prepare request from a coordinator is received at a first participant. A confirmation message indicating completion of a preparation stage is sent from the first participant to other participants. The confirmation message from the first participant is received at a second participant. In response to receiving the confirmation message, transaction-related data is retrieved by the second participant from the first participant using a transaction identifier. A preparation stage is completed by the second participant using the retrieved transaction-related data. A vote indicating readiness to commit the transaction is sent from the second participant to the coordinator.

DETAILED DESCRIPTION

Figure 1:
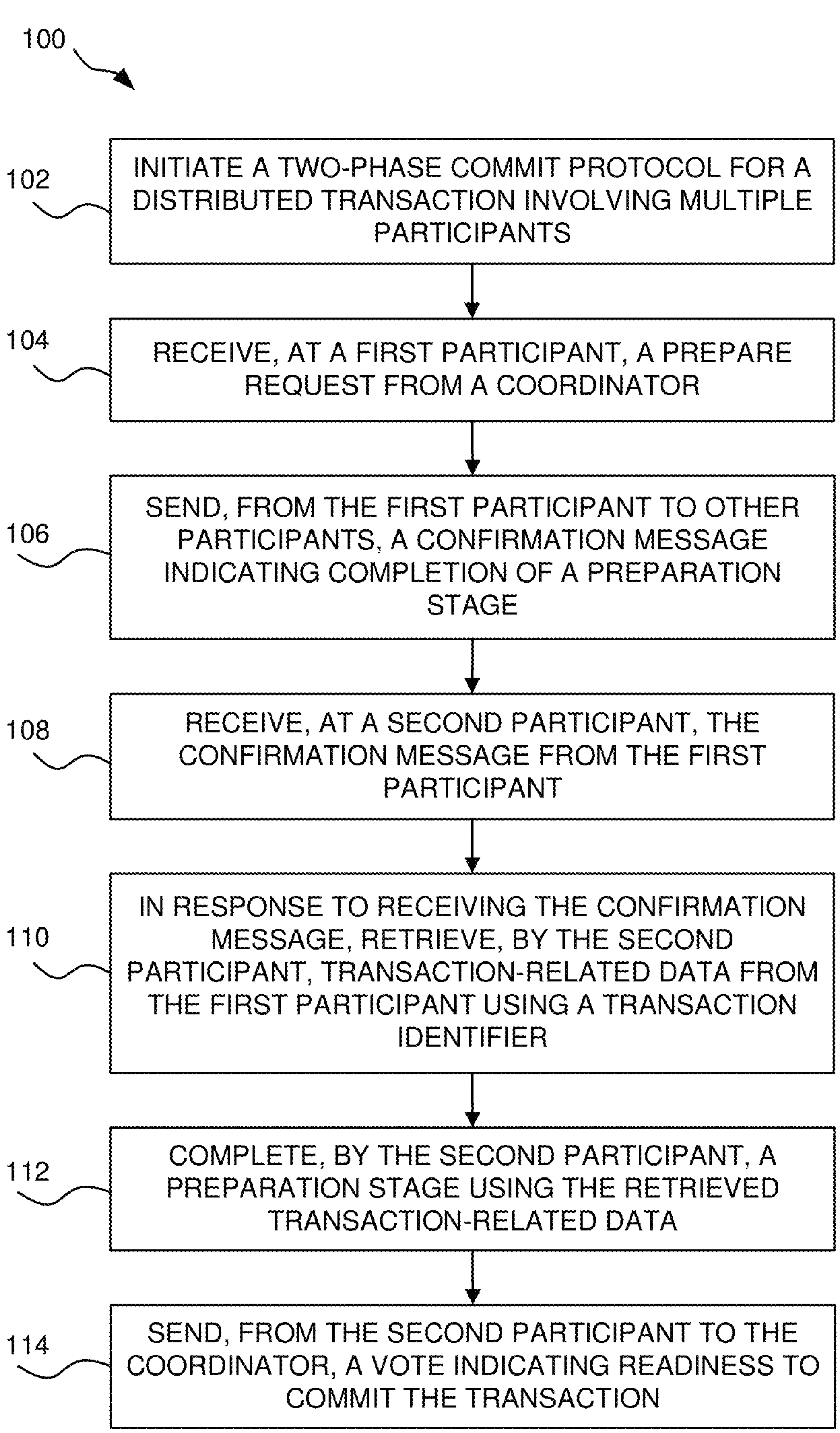
FIG. 1 illustrates a flowchart of a method for implementing a two-phase commit protocol with inter-participant dependencies, according to aspects of the present disclosure.

FIG. 1 illustrates a flowchart of a method for implementing a two-phase commit protocol with inter-participant dependencies, in accordance with one embodiment. The method may be carried out by a computer system, such as that described below with respect to FIGS. 9 and/or 10.

The method 100 begins with an operation 102, which initiates a two-phase commit protocol for a distributed transaction involving multiple participants. Initiating the two-phase commit protocol involves the coordinator sending prepare requests to all participants involved in the distributed transaction. This step may include generating a unique transaction identifier (e.g. random string, etc.) that will be used throughout the process to track and manage the transaction across multiple participants. The coordinator may also initialize internal data structures to keep track of the transaction state and participant responses.

In some implementations, the coordinator may perform pre-transaction checks before initiating the protocol. These checks may include verifying the availability of all participants, ensuring that the necessary resources are allocated, and/or validating any preconditions required for the transaction. The coordinator may also set up timeout mechanisms to handle scenarios where participants fail to respond within a specified time frame.

In operation 104, a first participant receives a prepare request from a coordinator. When a first participant receives a prepare request from the coordinator, it begins its local preparation process. This may involve validating the transaction details, checking for any conflicts with ongoing operations, and/or reserving necessary resources to execute the transaction. The participant may also create a local transaction log to record all changes that will be made as part of the transaction.

During this stage, the first participant may perform computations or data manipulations required for its part of the transaction. However, these changes are typically kept in a temporary state and not yet committed to the permanent data store. The participant may also implement locking mechanisms to prevent other processes from modifying the same data during the preparation phase.

In operation 106, the first participant sends a confirmation message to other participants indicating completion of a preparation stage. In one embodiment, the confirmation message is sent to both the coordinator and the participants. In one embodiment, this message may include the transaction identifier and additional metadata about the prepared changes. The confirmation message may serve as a signal to other participants that the first participant has successfully prepared its part of the transaction and is ready to proceed.

In some implementations, this inter-participant communication may be facilitated by the coordinator, and/or it may occur directly between participants in a peer-to-peer manner. The confirmation message may also include information about any dependencies that other participants need to be aware of, such as specific data changes or resource allocations.

In operation 108, a second participant receives the confirmation message from the first participant. When the second participant receives the confirmation message from the first participant, it acknowledges the readiness of the first participant. This step may involve updating the second participant's internal state to reflect the progress of the transaction. The second participant may also perform preliminary checks to ensure it can proceed with its own preparation based on the first participant's confirmation.

In some cases, the second participant may need to wait for confirmation messages from one or more participants before proceeding. For example, the participant may implement a synchronization mechanism to manage these dependencies and ensure that all necessary confirmations are received before moving to the next stage. Additionally, the confirmations demonstrates how the enhanced protocol allows for direct communication between participants, facilitating the handling of inter-participant dependencies.

In operation 110, the second participant retrieves transaction-related data from the first participant using a transaction identifier in response to receiving the confirmation message. Upon receiving the confirmation message, the second participant retrieves transaction-related data from the first participant using the transaction identifier. This step may involve making an API call or using a dedicated communication channel to fetch the necessary data. The retrieved data may include changes that have been prepared but not yet committed by the first participant. As such, this step allows participants to access uncommitted data from other participants during the preparation phase.

In some embodiments, the data retrieval process may be optimized to fetch only the relevant subset of data needed by the second participant. This can help reduce network traffic and improve overall transaction performance. The second participant may also implement caching mechanisms to store frequently accessed transaction data locally.

In some cases, the transaction-related data may include changes that have been prepared but not yet committed by the first participant. The second participant may use this data to ensure consistency across the distributed system and to properly prepare its own part of the transaction.

In operation 112, the second participant completes a preparation stage using the retrieved transaction-related data. Using the retrieved transaction-related data, the second participant completes its own preparation stage. This may involve validating the received data, performing necessary computations, and/or preparing any local changes required for the transaction. The second participant may also check for any conflicts or inconsistencies that could affect the overall transaction.

During this stage, the second participant may create its own local transaction log to record the changes it plans to make. It may also implement isolation mechanisms to ensure that the prepared changes are not visible to other processes until the transaction is fully committed. As such, the operation 112 allows the second participant to take into account the state of the first participant before finalizing its own preparation.

In various embodiments, the preparation stage may involve validating the retrieved data, performing necessary computations, and/or preparing any local changes required for the transaction. The second participant may also check for any conflicts or inconsistencies that could affect the overall transaction.

In operation 114, the second participant sends a vote to the coordinator indicating readiness to commit the transaction. After completing its preparation stage, the second participant sends a vote to the coordinator indicating its readiness to commit the transaction. This vote may include additional metadata about the participant's prepared state and any potential issues or warnings that the coordinator should be aware of.

In various embodiments, it is noted that this message in relation to the voting message may be the same type of message sent by the first participant. For example, after completing its preparing stage, a first participant may send YES to coordinator and participants. This voting message may be the message that participant 2 receives from participant 1.

In some implementations, the voting process may be more complex than a simple "yes" or "no" response. For example, participants may provide conditional votes or include additional information about their ability to commit under certain circumstances. The coordinator may use this detailed voting information to make more informed decisions about whether to proceed with the commit phase or initiate a rollback.

It is acknowledged that the methods and/or systems disclosed herein exemplify a resolution to the challenge of managing inter-participant dependencies in distributed transactions. By allowing participants to communicate directly and share uncommitted data during the preparation phase, the method addresses limitations of and overcomes issues associated with traditional two-phase commit protocols.

In various embodiments, more than two participants may be supported with complex interdependencies. For example, in various embodiments, each participant may be responsible for waiting for its dependencies. Additionally, a participant might depend on many other participants, or multiple participants might depend on the same other participant. Of course it is recognized that circular dependencies would not be feasible (e.g. if participants depend on each other, then there will be a deadlock). That being said, any other dependency hierarchy may be possible.

The coordinator may manage the order of participant preparations based on their dependencies, ensuring that each participant has access to the necessary data before completing its preparation stage. Additionally, additional error handling mechanisms may be incorporated. For example, if a participant fails to retrieve necessary data or encounters an error during preparation, the method may include steps for notifying the coordinator and other participants (such as a sending/voting message, etc.), potentially leading to a transaction abort. Additionally, in one embodiment, such dependency may cause a 2PC timeout mechanism, and cause the transaction to fail after a period of inactivity.

In various embodiments, parallel processing of independent preparation steps may be used. For example, participants without dependencies on others may proceed with their preparation simultaneously, potentially reducing overall transaction time. For example, participants that don't depend on other participant may not need to wait for anyone else (i.e. hey can try to prepare their data and return YES/NO accordingly, etc.)

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
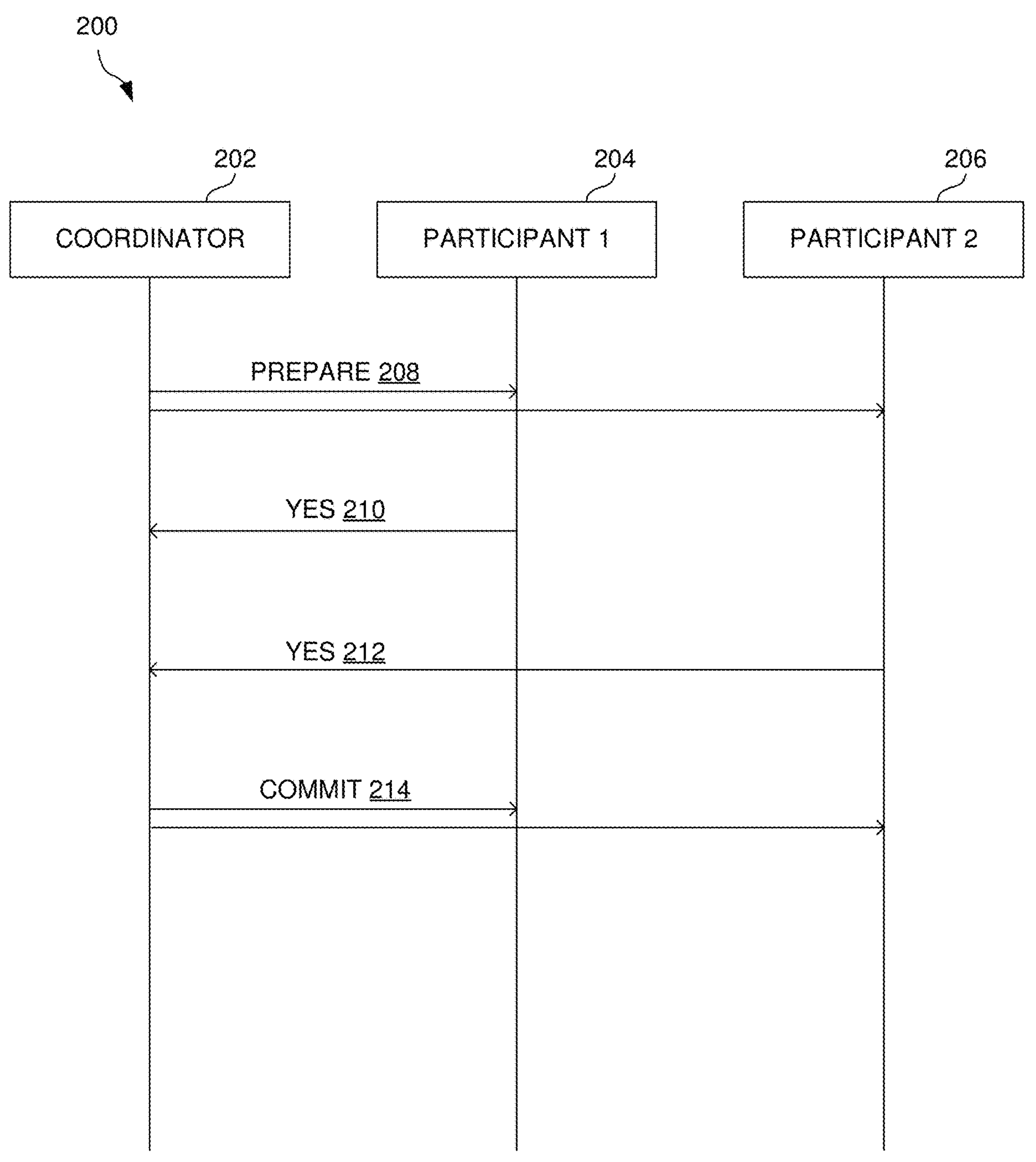
FIG. 2 shows a sequence diagram of a standard two-phase commit protocol interaction between a coordinator and two participants, in accordance with an embodiment.

FIG. 2 illustrates a sequence diagram 200 showing a standard two-phase commit protocol interaction, in accordance with one embodiment. As an option, the sequence diagram 200 may be implemented in the context of any one or more of the embodiments set forth in any previous and/or subsequent Figures and/or description thereof. Of course, however, the sequence diagram 200 may be implemented in the context of any desired environment. Further, the aforementioned definitions may equally apply to the description below.

The sequence diagram 200 depicts the interaction between a coordinator object 202 and two participant objects: a first participant object 204 and a second participant object 206. These objects represent the possible entities involved in the two-phase commit protocol, which is a distributed algorithm used to ensure all participants in a distributed system agree on whether to commit or abort a transaction. It is recognized (in this and any other Figure disclosed herein) that any number of participants may participate in the two-phase commit protocol, and the specific illustration of two participants presents a simplified view between two parties of how this may occur.

In the first phase of the protocol, the coordinator object 202 initiates the process by sending a prepare message 208 to both the first participant object 204 and the second participant object 206. This prepare message 208 serves as a request for each participant to prepare for the transaction and determine whether they are ready to commit.

Upon receiving the prepare message 208, each participant object performs necessary operations to prepare for the transaction. These operations may include validating data, reserving resources, and/or performing any other required pre-commit actions. The specific actions taken during this preparation phase may vary depending on the nature of the transaction and the role of each participant.

After completing their respective preparation processes, the participant objects respond to the coordinator object 202. The first participant object 204 sends a first confirmation message 210, while the second participant object 206 sends a second confirmation message 212. These confirmation messages indicate whether each participant is ready to commit the transaction or if they need to abort.

The confirmation messages 210 and 212 typically contain a "YES" vote if the participant is ready to commit, or a "NO" vote if the participant cannot proceed with the transaction. The coordinator object 202 waits to receive responses from all participants before proceeding to the next phase of the protocol.

Once the coordinator object 202 has received confirmation messages from all participants, it enters the second phase of the protocol. If all participants have voted "YES," the coordinator object 202 proceeds with the commit phase. In this case, the coordinator object 202 sends a commit message 214 to both the first participant object 204 and the second participant object 206.

The commit message 214 instructs the participants to finalize the transaction and make any changes permanent. Upon receiving this message, each participant object commits the transaction, typically by writing any changes to stable storage and releasing any resources that were held during the preparation phase.

Figure 3:
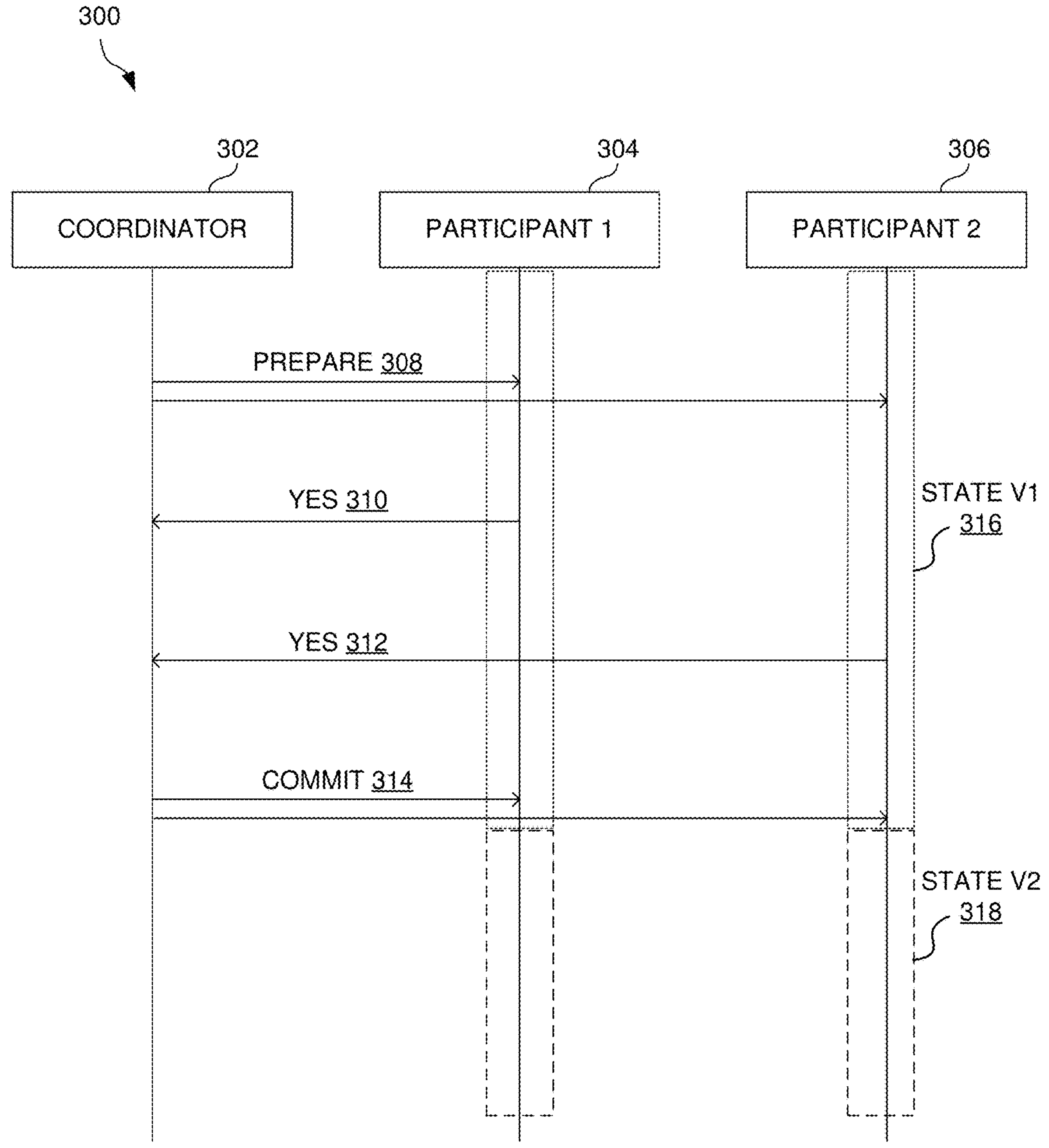
FIG. 3 depicts a sequence diagram of a two-phase commit protocol interaction with state transitions, according to an aspect of the present disclosure.

FIG. 3 illustrates a sequence diagram 300 showing a two-phase commit protocol interaction with state transitions, in accordance with one embodiment. As an option, the sequence diagram 300 may be implemented in the context of any one or more of the embodiments set forth in any previous and/or subsequent Figures and/or description thereof. Of course, however, the sequence diagram 300 may be implemented in the context of any desired environment. Further, the aforementioned definitions may equally apply to the description below.

The sequence diagram 300 depicts the interaction between a coordinator object 302, a first participant object 304, and a second participant object 306. In the first phase of the protocol, the coordinator object 302 initiates the process by sending a prepare message 308 to both the first participant object 304 and the second participant object 306.

Upon receiving the prepare message 308, each participant object performs necessary operations to prepare for the transaction. After completing their respective preparation processes, the participant objects respond to the coordinator object 302. The first participant object 304 sends a first confirmation message 310, while the second participant object 306 sends a second confirmation message 312. These confirmation messages indicate whether each participant is ready to commit the transaction or if they need to abort.

In some cases, the confirmation messages may include additional information about the participant's state or any potential issues encountered during the preparation phase. This information may be used by the coordinator object 302 to make a more informed decision about whether to proceed with the commit or initiate an abort procedure.

After receiving positive confirmations from both participants, the coordinator object 302 proceeds with the commit phase by sending a commit message 314 to both participant objects. This commit message 314 instructs the participants to finalize the transaction and make any prepared changes permanent.

The sequence diagram 300 also illustrates an important aspect of the two-phase commit protocol: state transitions. Specifically, the first participant object 304 and the second participant object 306 are shown to transition from a first state 316 (labeled as STATE V1) to a second state 318 (labeled as STATE V2). This state transition occurs after the commit phase of the protocol.

In some cases, the first state 316 may represent the initial state of each of the first participant object 304 and/or the second participant object 306 before the transaction begins. The second state 318 may represent the final state after the transaction has been successfully committed. The transition between these states demonstrates how the two-phase commit protocol ensures that all participants move to a new, consistent state only after the transaction has been fully committed per the commit message 314.

In various embodiments, the state information represented by the first state 316 and the second state 318 enables a more comprehensive and holistic view of the availability of each participant by providing insight into the progression of the transaction process. The first state 316 may represent the initial state of the first participant 304 second participant 306 after receiving the prepare message 308, indicating that each of the participants has acknowledged the transaction request and is in the process of preparing its resources. This state information allows the coordinator and other participants to understand that each of the participants is actively engaged in the transaction but has not yet completed its preparation phase.

The second state 318, on the other hand, may represent the state of an of the participants after receiving the commit message 314 and finalizing its part of the transaction.

Figure 4:
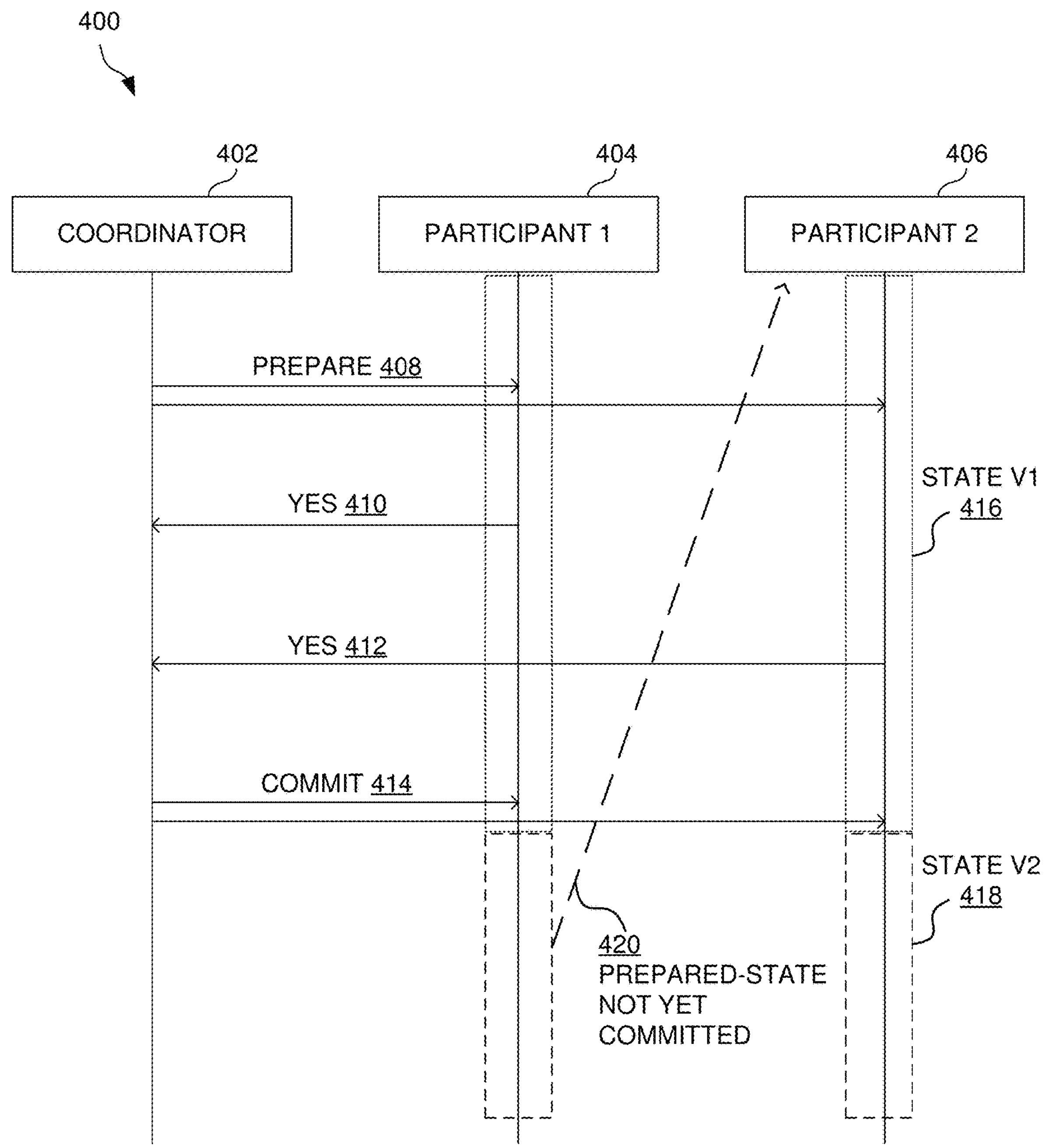
FIG. 4 illustrates a sequence diagram of an enhanced two-phase commit protocol with multiple participants and intermediate states, according to an embodiment.

FIG. 4 illustrates a sequence diagram 400 showing an enhanced two-phase commit protocol with multiple participants, in accordance with one embodiment. As an option, the sequence diagram 400 may be implemented in the context of any one or more of the embodiments set forth in any previous and/or subsequent Figures and/or description thereof. Of course, however, the sequence diagram 400 may be implemented in the context of any desired environment. Further, the aforementioned definitions may equally apply to the description below.

The sequence diagram 400 depicts the interaction between a coordinator object 402, a first participant object 404, and a second participant object 406. These objects represent possible entities involved in the enhanced two-phase commit protocol, which extends the standard protocol to address inter-participant dependencies in distributed transactions.

The sequence begins with the coordinator object 402 sending a prepare message 408 to both the first participant object 404 and the second participant object 406. Upon receiving the prepare message 408, the first participant object 404 processes its part of the transaction and responds with a first confirmation message 410 to the coordinator object 402. This first confirmation message 410 indicates that the first participant object 404 has successfully prepared its changes and is ready to commit.

Following the first confirmation message 410, the second participant object 406 sends a second confirmation message 412 to the coordinator object 402. This message indicates that the second participant object 406 has also completed its preparation phase and is ready to commit the transaction.

In some cases, the second confirmation message 412 may be delayed if the second participant object 406 has dependencies on data from the first participant object 404. The enhanced protocol allows for such dependencies by enabling participants to access prepared but uncommitted data from other participants during the preparation phase.

After receiving positive confirmations from both participants, the coordinator object 402 issues a commit message 414 to finalize the transaction. This commit message 414 is sent to both the first participant object 404 and the second participant object 406, instructing them to make their prepared changes permanent.

State transitions are also shown, specifically, a first state 416 (labeled as STATE V1) and a second state 418 (labeled as STATE V2), as described hereinabove.

Also shown is a preparation notification 420, labeled as "PREPARED-STATE NOT YET COMMITTED". This intermediate state represents the changes which have been prepared by one or more participants but not yet committed to the system.

In some cases, the preparation notification 420 may allow other participants to access and use the prepared data before the final commit decision is made. This feature enables complex inter-service dependencies to be managed within the context of a single distributed transaction, improving overall system consistency and reliability. By introducing the preparation notification 420 and allowing access to prepared but uncommitted data, the enhanced protocol addresses limitations of traditional two-phase commit protocols, which typically do not support such inter-participant interactions during the preparation phase.

During the period associated with the preparation notification 420, participants may have made changes to their local data or reserved necessary resources, but these changes may not yet permanent. The explicit representation of this state in the protocol allows for improved visibility and management of the transaction process.

In some implementations, the prepared-state may be leveraged to enable advanced features of the enhanced protocol. For instance, participants in this state may be allowed to share their prepared but uncommitted data with other participants, facilitating complex inter-participant dependencies. This sharing may be accomplished through a secure API or a distributed cache, with access controlled by the transaction identifier. Additionally, the coordinator may use information about which participants are in the prepared-state to make more informed decisions about transaction progress, timeout handling, and/or recovery procedures in case of participant failures. In one embodiment, the duration of the state of the preparation notification 420 may also be monitored and used as a performance metric to optimize the overall efficiency of the distributed transaction system.

Figure 5:
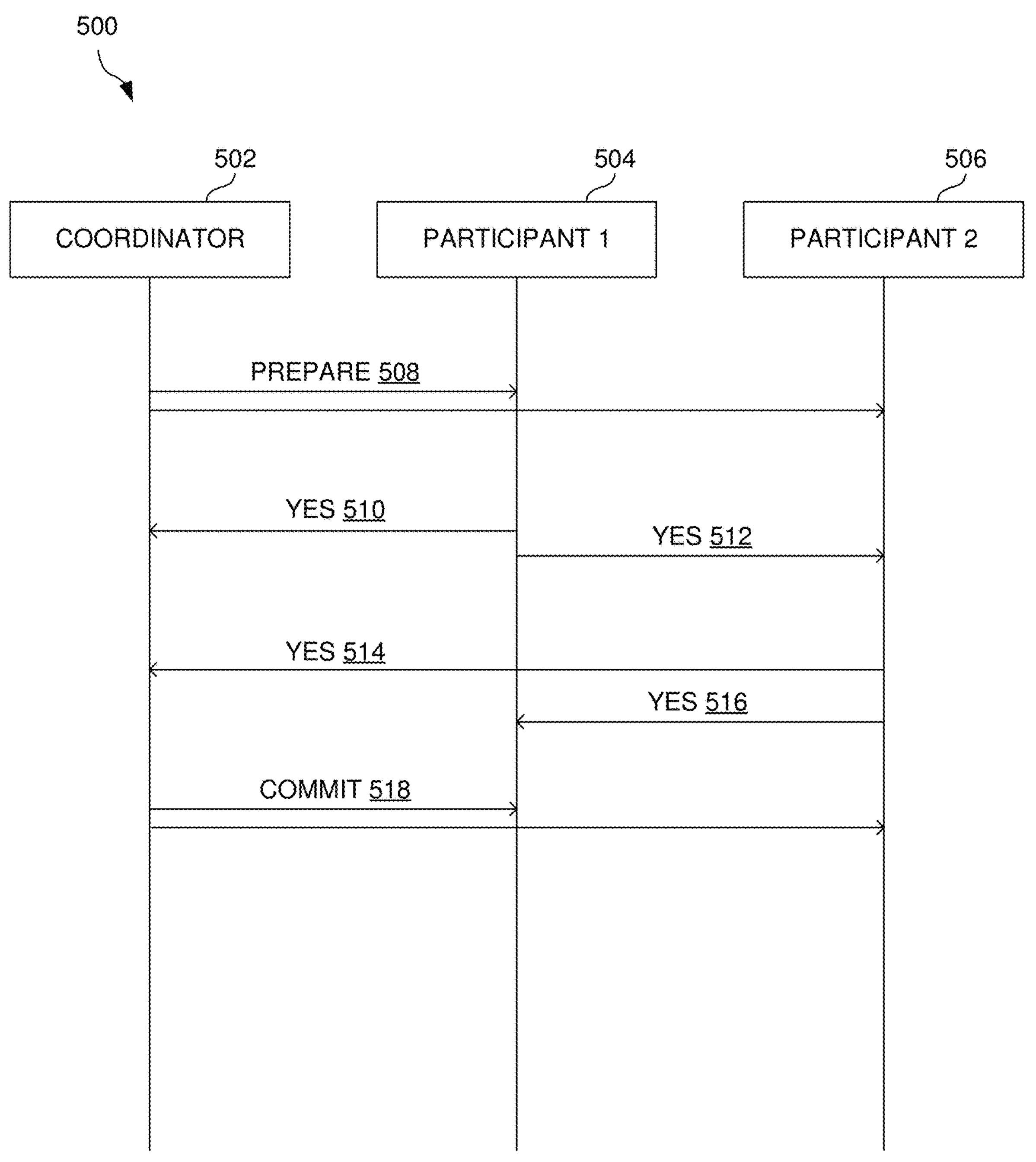
FIG. 5 shows a sequence diagram of an enhanced two-phase commit protocol with inter-participant communication, in accordance with example embodiments.

FIG. 5 illustrates a sequence diagram 500 showing the enhanced two-phase commit protocol with inter-participant communication, in accordance with one embodiment. As an option, the sequence diagram 500 may be implemented in the context of any one or more of the embodiments set forth in any previous and/or subsequent Figures and/or description thereof. Of course, however, the sequence diagram 500 may be implemented in the context of any desired environment. Further, the aforementioned definitions may equally apply to the description below.

The sequence diagram 500 depicts the interaction between a coordinator object 502, a first participant object 504, and a second participant object 506. The sequence begins with the coordinator object 502 sending a prepare message 508 simultaneously to both the first participant object 504 and the second participant object 506.

After receiving the prepare message 508, the first participant object 504 processes its part of the transaction and responds with a first confirmation message 510 to the coordinator object 502. This first confirmation message 510 indicates that the first participant object 504 has successfully prepared its changes and is ready to commit.

In the enhanced protocol, the first participant object 504 also sends a second confirmation message 512 directly to the second participant object 506. This direct communication between participants is a feature of the enhanced protocol, enabling participants to be aware of each other's status during the transaction.

In some cases, the second confirmation message 512 may include additional information about the first participant object 504's prepared state, allowing the second participant object 506 to access and use this information if needed for its own preparation phase.

Following the receipt of the second confirmation message 512, the second participant object 506 processes its part of the transaction and sends a third confirmation message 514 to the coordinator object 502. This message indicates that the second participant object 506 has completed its preparation phase and is ready to commit the transaction.

The second participant object 506 also sends a fourth confirmation message 516 directly to the first participant object 504, completing the cross-communication between participants. This bidirectional communication ensures that both participants are fully aware of each other's status throughout the transaction process.

Once all confirmations are received, the coordinator object 502 sends a final commit message 518 to both the first participant object 504 and the second participant object 506 to complete the transaction. This commit message 518 instructs the participants to finalize the transaction and make any prepared changes permanent.

In some embodiments, the sequence diagram 500 exemplifies a resolution to the challenge of managing complex inter-participant dependencies in distributed transactions. By enabling direct communication between participants, the enhanced protocol allows for more efficient handling of scenarios where one participant's actions depend on the state of another participant. Additionally, the diagram may be extended to include additional participants, each capable of direct communication with other participants. This may be particularly useful in complex distributed systems where multiple services or nodes need to coordinate their actions during a transaction.

Figure 6:
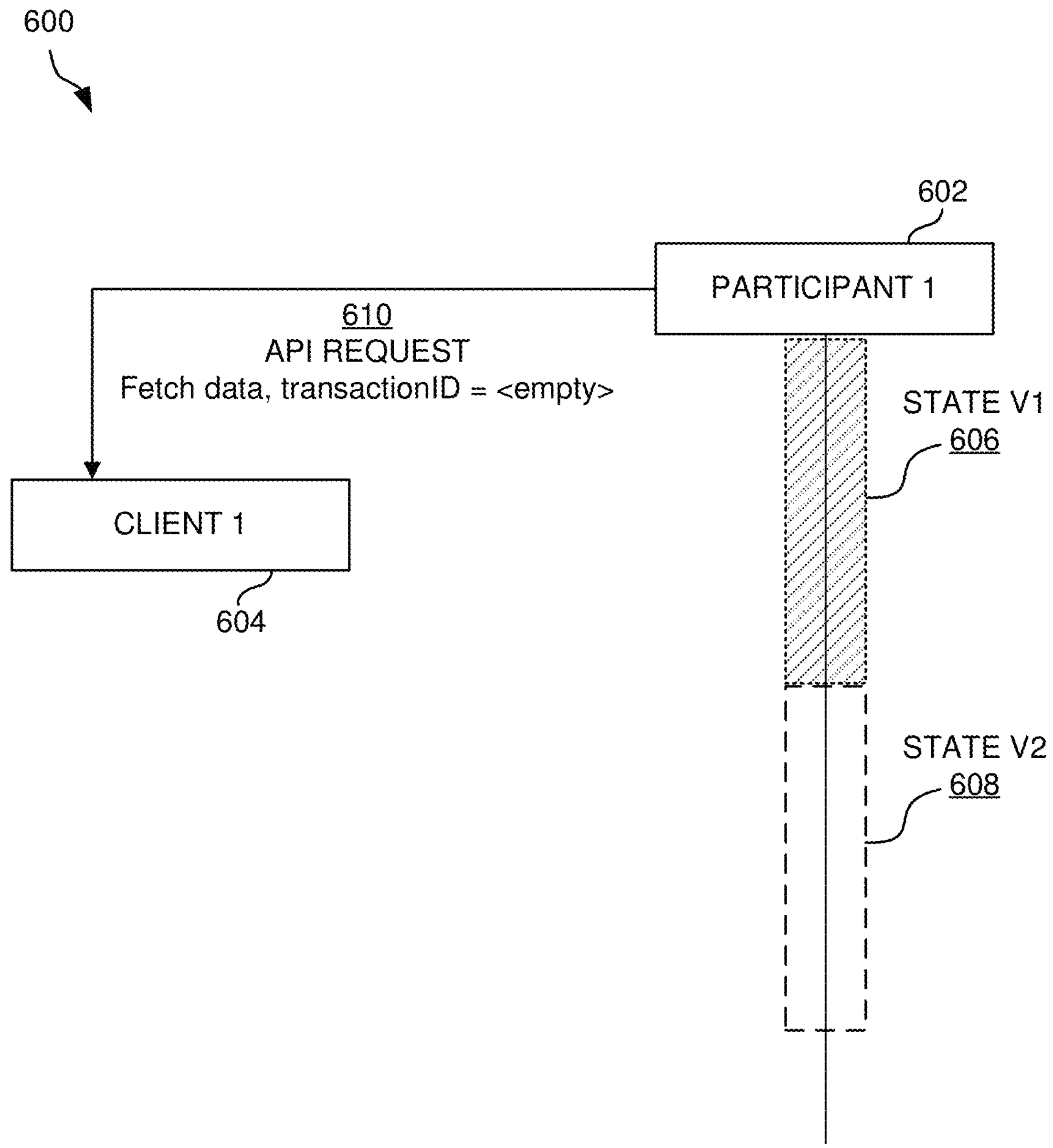
FIG. 6 depicts a system diagram showing the interaction between a participant and a client in a distributed transaction system, according to aspects of the present disclosure.

FIG. 6 illustrates a system diagram 600 showing the interaction between a participant and a client in a distributed transaction system, in accordance with one embodiment. As an option, the system diagram 600 may be implemented in the context of any one or more of the embodiments set forth in any previous and/or subsequent Figures and/or description thereof. Of course, however, the system diagram 600 may be implemented in the context of any desired environment. Further, the aforementioned definitions may equally apply to the description below.

The system diagram 600 includes a first participant 602 and a first client 604. The first participant 602 maintains two states: a first state 606 (labeled as STATE V1) and a second state 608 (labeled as STATE V2). These states may represent different versions of data or system configurations within the first participant 602 during a distributed transaction. In one embodiment, STATE V1 may include the currently committed data (e.g. current contents without taking into account the new changes), and STATE V2 may include "PREPARED-STATE NOT YET COMMITTED."

In some cases, the first state 606 may represent the initial state of the first participant 602 before a transaction begins, while the second state 608 may represent the state after certain operations have been performed or changes have been prepared but not yet committed.

The first client 604 interacts with the first participant 602 through a request message 610. The request message 610 is shown as an API REQUEST that includes a parameter for fetching data. In this case, the transactionID parameter is empty, indicating a request for the current committed state of the first participant 602. The first state 606 is shown as being active for when the request message 610 is sent.

In some cases, the request message 610 may include a specific transactionID to retrieve data from a particular transaction state, allowing the first client 604 to access prepared but uncommitted data when necessary.

As such, the first client 604 (or any particular client) can receive different states of the first participant 602 (or any participant) through API requests. In some cases, the first participant 602 may implement access control mechanisms to ensure that only authorized clients can retrieve data from specific transaction states, maintaining data integrity and security within the distributed system.

By allowing clients to access different states of a participant, including prepared but uncommitted states, the system addresses limitations of traditional approaches where clients could only interact with fully committed data. In various embodiments, the request message 610 may be enhanced to include additional parameters or metadata. These enhancements could provide more fine-grained control over data retrieval, such as specifying isolation levels, consistency requirements, and/or time-based constraints for accessing participant states.

In various embodiments, the first participant 602 may implement versioning mechanisms to manage multiple concurrent transactions. This approach would allow the first participant 602 to maintain and provide access to multiple versions of its data, corresponding to different ongoing transactions, further improving the system's ability to handle complex distributed operations.

Figure 7:
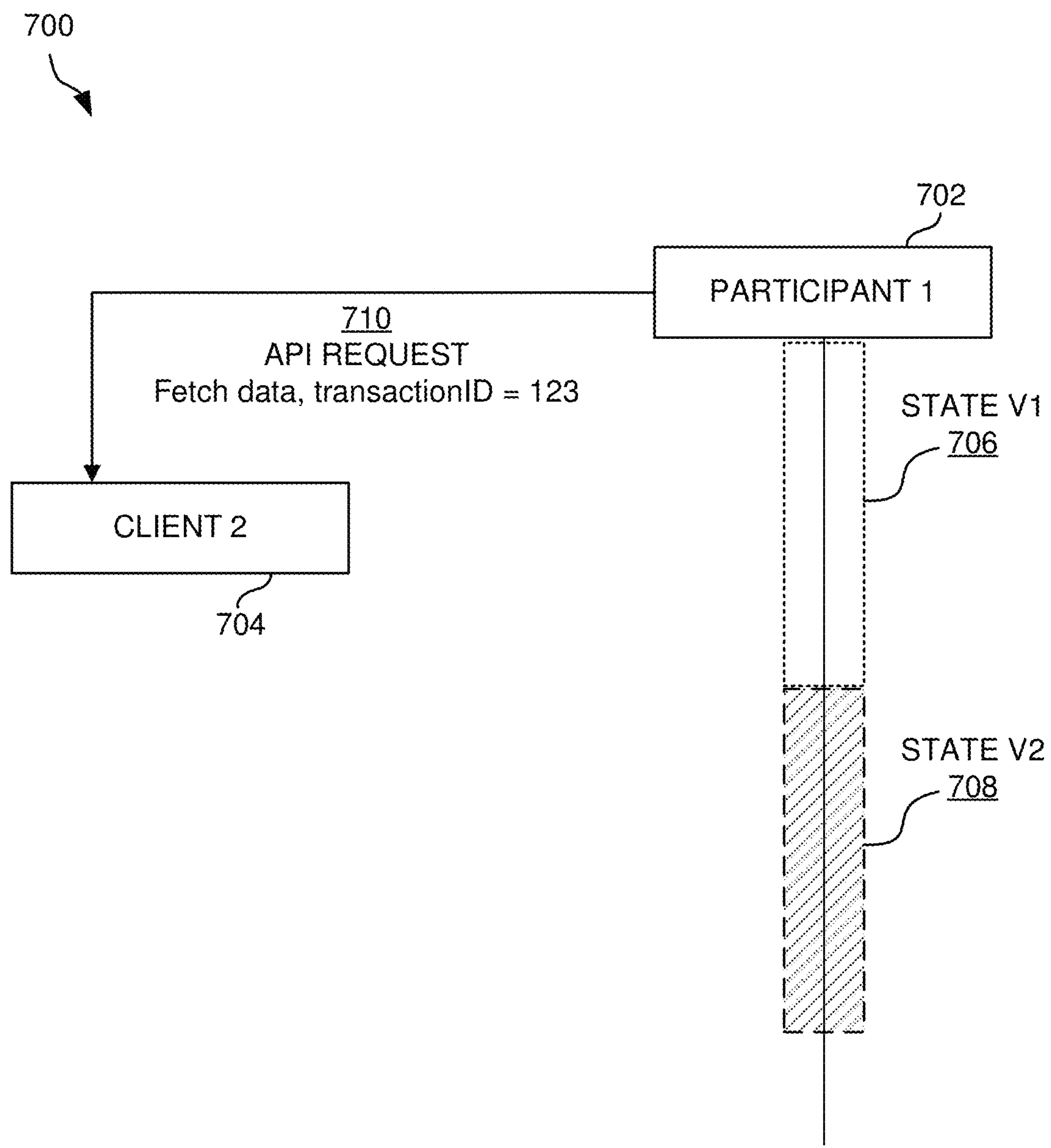
FIG. 7 illustrates a sequence diagram showing the interaction between a participant system and a client during a transaction state transition, according to an embodiment.

FIG. 7 illustrates a sequence diagram 700 showing the interaction between a participant system and a client during a transaction state transition, in accordance with one embodiment. As an option, the sequence diagram 700 may be implemented in the context of any one or more of the embodiments set forth in any previous and/or subsequent Figures and/or description thereof. Of course, however, the sequence diagram 700 may be implemented in the context of any desired environment. Further, the aforementioned definitions may equally apply to the description below.

The sequence diagram 700 depicts the interaction between a first participant 702 and a second client 704. The first participant 702 maintains two distinct states: a first state 706 represented by dotted lines and a second state 708 represented by hatched lines. In particular, the sequence diagram 700 illustrates a feature of the enhanced two-phase commit protocol: the ability for participants to access uncommitted transaction data. This is demonstrated by a request message 710, which is an API request initiated by the second client 704 to fetch data from the first participant 702. The request message 710 includes a transactionId parameter with a value of 123.

In some cases, the transactionId parameter in the request message 710 may be used to specify which version of the data the second client 704 wishes to access. By including the transactionId, the second client 704 can retrieve data associated with a specific ongoing transaction, even if that data has not yet been committed to the system.

The inclusion of the transactionId parameter in the API request message 710 allows the first participant 702 to determine which state of data to return. If the transactionId matches an ongoing transaction, the first participant 702 may return data from the second state 708, which represents the uncommitted changes associated with that transaction. If no transactionId is provided or if it does not match any ongoing transaction, the first participant 702 may default to returning data from the first state 706, which represents the current committed state. As shown in FIG. 7, the second state 708 is active, meaning that the request message 710 is being sent during an uncommitted phase. In one embodiment, in case a transactionid is provided but is invalid, the API may may return an error, and accept only valid or empty values.

Figure 8:
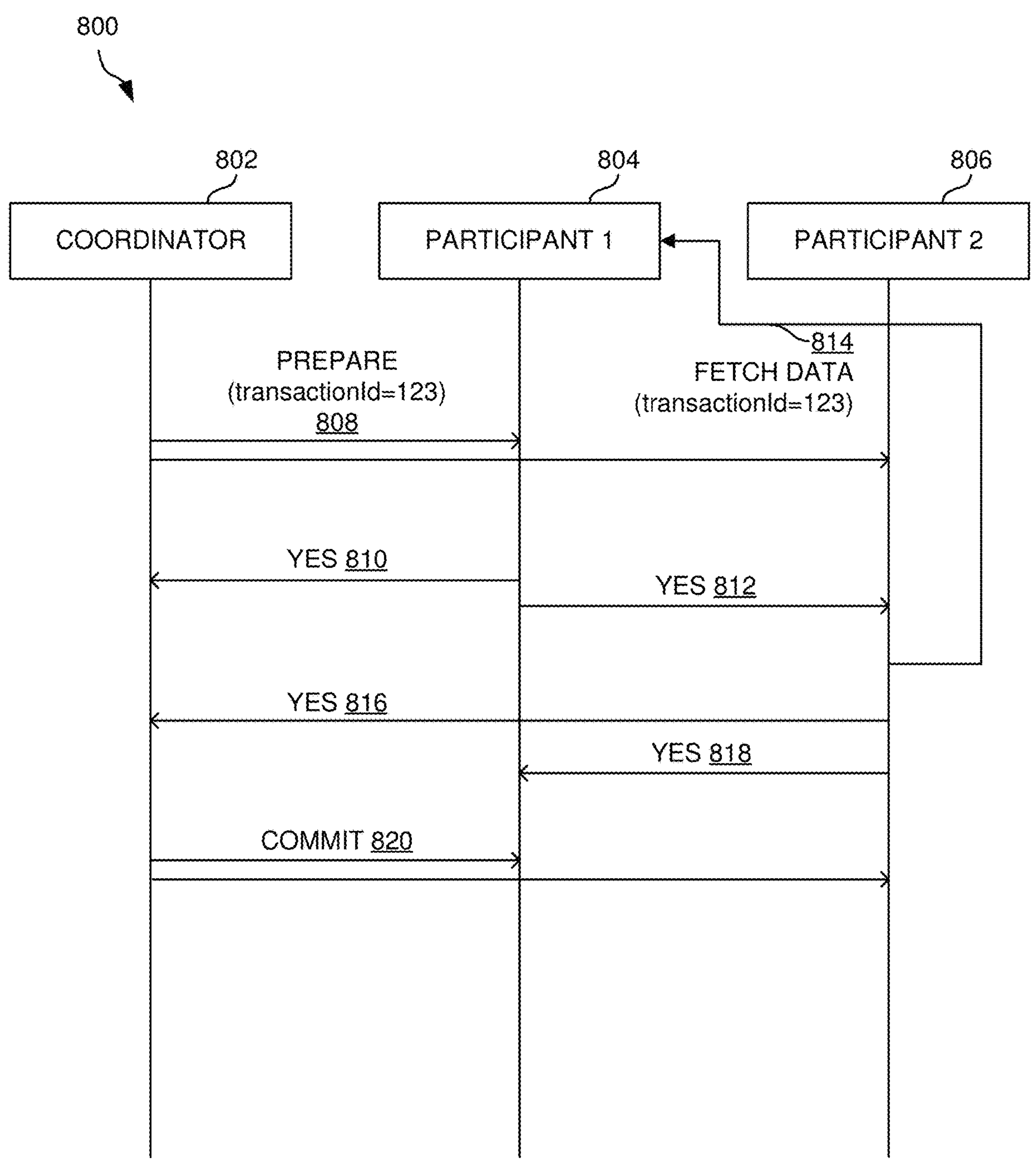
FIG. 8 shows a sequence diagram of an enhanced two-phase commit protocol with inter-participant dependencies, in accordance with example embodiments.

FIG. 8 illustrates a sequence diagram 800 showing the enhanced two-phase commit protocol with inter-participant dependencies, in accordance with one embodiment. As an option, the sequence diagram 800 may be implemented in the context of any one or more of the embodiments set forth in any previous and/or subsequent Figures and/or description thereof. Of course, however, the sequence diagram 800 may be implemented in the context of any desired environment. Further, the aforementioned definitions may equally apply to the description below.

The sequence diagram 800 depicts the interaction between a coordinator object 802, a first participant object 804, and a second participant object 806. The sequence begins with the coordinator object 802 sending a prepare message 808 with transactionId=123 to both the first participant object 804 and the second participant object 806. This prepare message 808 initiates the preparation phase of the transaction and includes a unique transaction identifier to distinguish the current transaction from others in the system.

In some cases, the prepare message 808 may contain additional metadata specific to each participant, such as the scope of data to be processed or any particular constraints for the transaction. This allows the coordinator object 802 to tailor the preparation instructions for each participant based on their role in the distributed system.

Upon receiving the prepare message 808, the first participant object 804 processes its part of the transaction and responds with a first confirmation message 810 to the coordinator object 802. This first confirmation message 810 indicates that the first participant object 804 has successfully prepared its changes and is ready to commit.

The second confirmation message 812 is also sent to the second participant object 806, indicating the first participant object 804's successful preparation. In some embodiments, the second confirmation message 812 may be sent simultaneous with the first confirmation message 810.

After receiving the second confirmation message 812, the second participant object 806 initiates a data fetch message 814 using the same transactionId=123 to retrieve necessary data from the first participant object 804. This data fetch message 814 is a component of the enhanced protocol, allowing the second participant object 806 to access uncommitted transaction data from the first participant object 804 during the preparation phase.

In some cases, the data fetch message 814 may include specific parameters or filters to retrieve only the relevant subset of data needed by the second participant object 806. This targeted data retrieval may help optimize the transaction process and reduce unnecessary data transfer between participants.

Once the second participant object 806 has processed the fetched data, the second participant object 806 sends a third confirmation message 816 to the coordinator object 802. This message indicates that the second participant object 806 has completed its preparation phase and is ready to commit the transaction.

In some cases, the third confirmation message 816 may include information about any dependencies that were resolved using the fetched data, providing the coordinator object 802 with a more comprehensive view of the transaction's progress and interdependencies.

The second participant object 806 also sends a fourth confirmation message 818 to the first participant object 804, completing the cross-communication between participants. This bidirectional communication ensures that both participants are fully aware of each other's status throughout the transaction process.

Finally, after receiving positive confirmations from both participants, the coordinator object 802 sends a commit message 820 to both the first participant object 804 and the second participant object 806 to finalize the transaction. This commit message 820 instructs the participants to make their prepared changes permanent and complete the transaction.

In one embodiment, FIG. 8 exemplifies a complete possible flow of the enhanced two-phase commit protocol, integrating the concepts illustrated in FIGS. 2-7.

The data fetch message 814 in represents a component of the enhanced protocol, allowing participants to access and utilize prepared but uncommitted data from other participants during the transaction. This feature may be particularly useful in scenarios where one participant's actions depend on the state or data of another participant. For example, in an e-commerce system, an inventory service might need to check the status of a payment service before finalizing a product reservation. The ability to fetch this intermediate data enables more complex and interdependent transactions while maintaining overall system consistency.

In some implementations, the enhanced protocol may incorporate additional safeguards and optimizations around the inter-participant communication and data fetching processes. For instance, the protocol may include mechanisms for handling scenarios where fetched data becomes invalidated due to transaction aborts or timeouts. Additionally, the system may implement caching strategies to reduce the need for repeated data fetches, and/or employ parallel processing techniques to allow multiple participants to fetch and process data simultaneously, potentially improving overall transaction throughput. Lastly, the protocol may also include provisions for partial commits and/or rollbacks in cases where some participants successfully complete their operations while others encounter issues, providing more granular control over transaction outcomes in complex distributed systems.

By way of example, the enhanced two-past commit protocol may relate to a variety of situations. For simplicity, two examples are provided below. However, it is to be understood that such examples are merely exemplary and are not intended to restrict the disclosure in any manner. Other possible situations are envisioned.

In an e-commerce platform, the enhanced two-phase commit protocol could significantly improve the order processing workflow. Consider a scenario where a customer places an order for a limited-edition product. The transaction involves multiple services: inventory, payment, and shipping. Using the enhanced protocol, the inventory service (Participant 1) could reserve the item and enter a prepared state. The payment service (Participant 2) could then fetch this prepared state data using the transaction identifier to confirm the item's availability before processing the payment. If the payment is successful, the shipping service (Participant 3) could fetch data from both the inventory and payment services to calculate accurate shipping costs and prepare the shipment details. This inter-service communication allows for real-time inventory checks, dynamic pricing adjustments, and optimized shipping calculations within a single distributed transaction. If any service encounters an issue (e.g., payment failure or inventory shortage), the protocol ensures that all services can roll back their prepared changes consistently, maintaining system integrity and preventing issues like overselling or incorrect charges.

In a financial trading system, the enhanced protocol could enable more complex and reliable trade executions across multiple markets or asset classes. For instance, a large institutional trade might involve simultaneous transactions in stocks, options, and futures markets to hedge risk. The protocol could coordinate these actions across different trading services (each represented as a participant). The stock trading service (Participant 1) could prepare its part of the transaction and make this information available. The options trading service (Participant 2) could then fetch this prepared data to adjust its trading parameters based on the stock transaction details. Similarly, the futures trading service (Participant 3) could access prepared data from both stock and options services to fine-tune its execution strategy. This level of coordination allows for more sophisticated trading strategies that can adapt in real-time to market conditions and the status of related trades. The protocol ensures that either all parts of the complex trade are executed successfully, or none are, preventing partial executions that could expose the institution to unintended risk. Additionally, the system could incorporate risk management services that fetch prepared transaction data from all trading services to perform last-minute compliance checks or risk assessments before the final commit, adding an extra layer of security and regulatory compliance to the trading process.

Further, in one embodiment, the enhanced two-phase commit protocol may be implemented in a distributed data processing and indexing system. Participant 1 may be a data processing service that receives raw data and performs various transformations, such as data cleansing, normalization, and enrichment. Once Participant 1 completes its processing, it enters a prepared state and makes its processed data available to other participants. Participant 2 may be an indexing service that retrieves the processed data from Participant 1 using the transaction identifier. Participant 2 may then create multiple specialized indexes based on the processed data, such as inverted indexes for full-text search capabilities, graph structures for relationship-based queries, and geospatial indexes for location-based lookups. These indexes may be prepared but not yet committed to the live system. During this process, if either Participant 1 fails to process the data or Participant 2 encounters issues while creating the indexes, the coordinator may abort the transaction. This ensures that the system maintains consistency, preventing scenarios where processed data exists without corresponding indexes or vice versa. Only when both participants successfully complete their respective tasks and vote to commit does the coordinator finalize the transaction, making the processed data and new indexes available for use in the production environment.

As such, the enhanced two-phase commit protocol illustrated in FIG. 8 represents a significant improvement over prior art distributed transaction systems by addressing the limitations of traditional protocols in handling complex inter-participant dependencies. Unlike conventional two-phase commit protocols, which typically isolate participants during the preparation phase, this enhanced approach enables direct communication and data sharing between participants before the final commit decision. This capability allows for more sophisticated transaction scenarios, where one participant's actions may depend on the intermediate state or data of another participant. By introducing the concept of accessible prepared-but-uncommitted states and facilitating data fetching using transaction identifiers (amongst other aspects disclosed herein), the protocol enhances system flexibility and consistency in distributed environments. This improvement may lead to more efficient and reliable transaction processing in various domains, such as e-commerce, financial systems, and cloud-based services, where complex, interdependent operations across multiple services or nodes are common. The enhanced protocol thus bridges a critical gap in existing distributed transaction management systems, potentially enabling new classes of applications and improving the performance and reliability of distributed systems.

Figure 9:
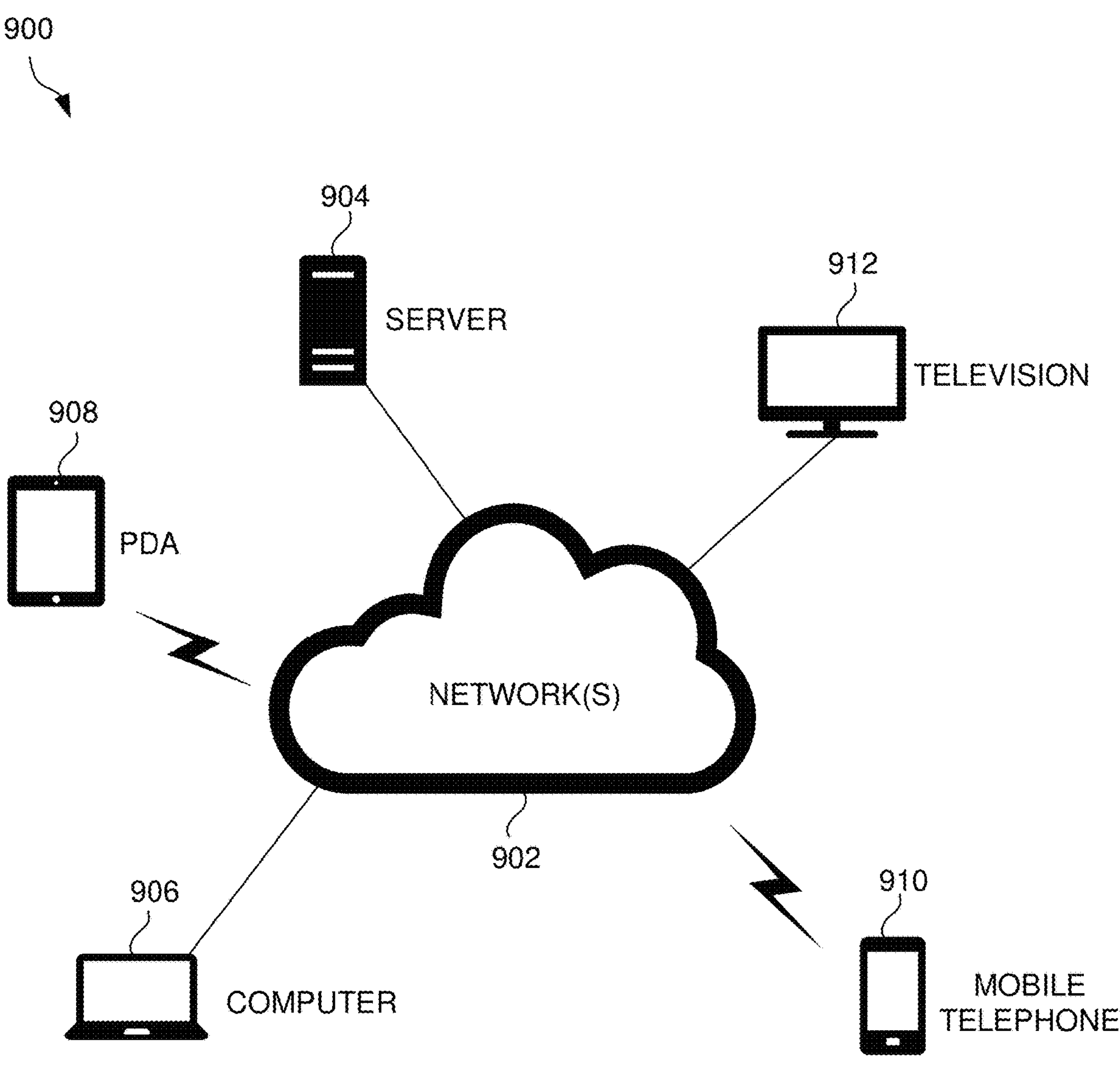
FIG. 9 illustrates a network architecture, in accordance with one possible embodiment.

FIG. 9 illustrates a network architecture 900, in accordance with one possible embodiment. As shown, at least one network 902 is provided. In the context of the present network architecture 900, the network 902 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 902 may be provided.

Coupled to the network 902 is a plurality of devices. For example, a server computer 904 and an end user computer 906 may be coupled to the network 902 for communication purposes. Such end user computer 906 may include a desktop computer, lap-top computer, and/or any other type of logic. Still yet, various other devices may be coupled to the network 902 including a personal digital assistant (PDA) device 908, a mobile phone device 910, a television 912, etc.

Figure 10:
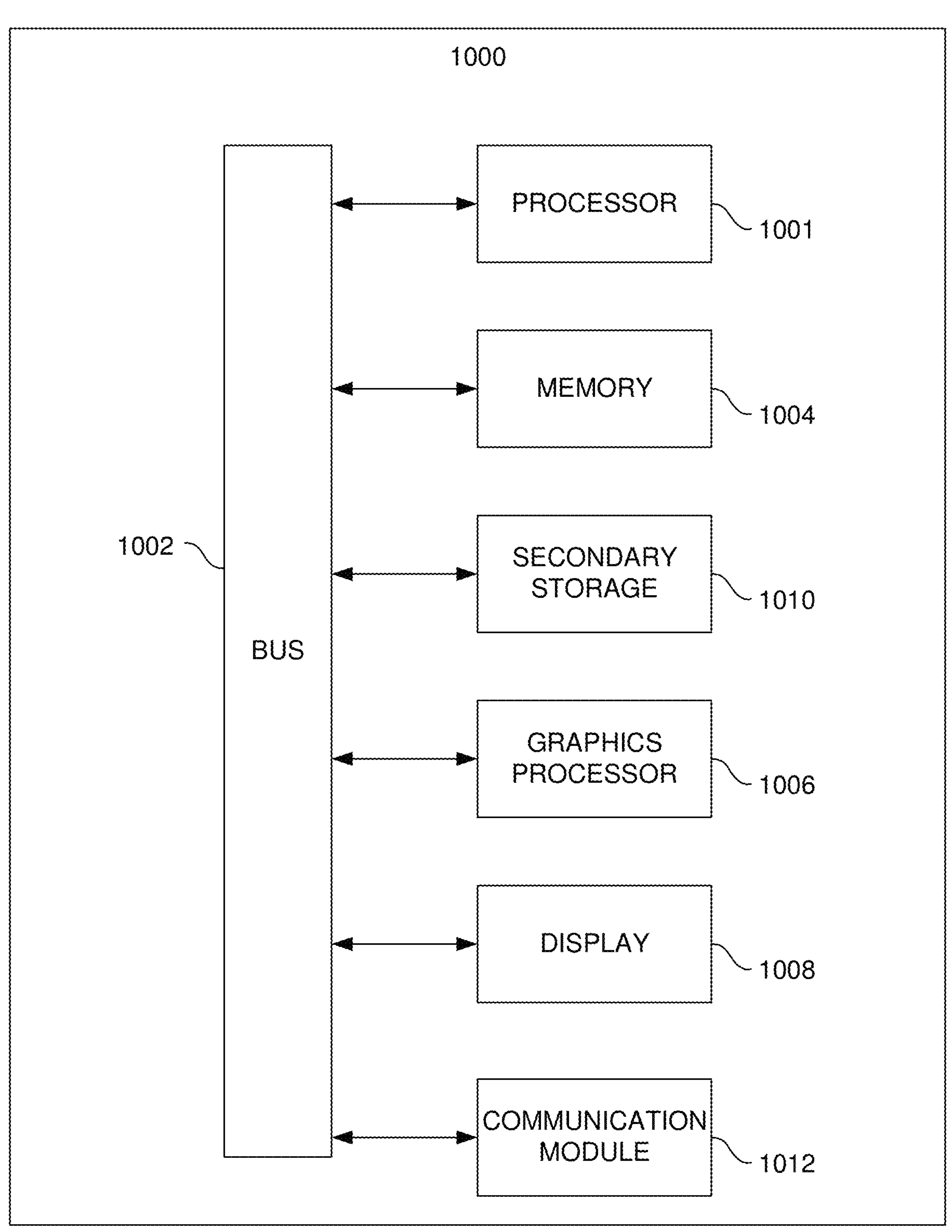
FIG. 10 illustrates an exemplary system, in accordance with one embodiment.

FIG. 10 illustrates an exemplary system 1000, in accordance with one embodiment. As an option, the system 1000 may be implemented in the context of any of the devices of the network architecture 900 of FIG. 9. Of course, the system 1000 may be implemented in any desired environment.

As shown, a system 1000 is provided including at least one central processor 1001 which is connected to a communication bus 1002. The system 1000 also includes main memory 1004 [e.g. random access memory (RAM), etc.]. The system 1000 also includes a graphics processor 1006 and a display 1008.

The system 1000 may also include a secondary storage 1010. The secondary storage 1010 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 1004, the secondary storage 1010, and/or any other memory, for that matter. Such computer programs, when executed, enable the system 1000 to perform various functions (as set forth above, for example). Memory 1004, storage 1010 and/or any other storage are possible examples of non-transitory computer-readable media.

The system 1000 may also include one or more communication modules 1012. The communication module 1012 may be operable to facilitate communication between the system 1000 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:

initiate a two-phase commit protocol for a distributed transaction involving multiple participants;

receive, at a first participant, a prepare request from a coordinator;

send, from the first participant to other participants, a confirmation message indicating completion of a preparation stage;

receive, at a second participant, the confirmation message from the first participant;

in response to receiving the confirmation message, retrieve, by the second participant, transaction-related data from the first participant using a transaction identifier;

complete, by the second participant, a preparation stage using the retrieved transaction-related data; and send, from the second participant to the coordinator, a vote indicating readiness to commit the transaction.

2. The non-transitory computer-readable media of claim 1, wherein the transaction identifier is included as a parameter in an API request to retrieve the transaction-related data from the first participant.

3. The non-transitory computer-readable media of claim 1, wherein the instructions further cause the device to make the transaction-related data from the first participant available to other participants before the distributed transaction is committed.

4. The non-transitory computer-readable media of claim 1, wherein the instructions further cause the device to abort the distributed transaction if any participant votes to abort or fails to respond within a predetermined time period.

5. The non-transitory computer-readable media of claim 1, wherein the instructions further cause the device to commit the distributed transaction only if all participants, including the second participant that depends on data from the first participant, vote to commit.

6. The non-transitory computer-readable media of claim 1, wherein:

the transaction-related data includes changes that have been prepared but not yet committed by the first participant; and the second participant uses the transaction-related data to ensure consistency across a distributed system associated with the distributed transaction.

7. The non-transitory computer-readable media of claim 1, wherein the instructions further cause the device to:

receive, at the coordinator, votes from all participants; and send a commit request to all participants if all votes indicate readiness to commit.

8. The non-transitory computer-readable media of claim 7, wherein the instructions further cause the device to send an abort request to all participants if at least one vote indicates inability to commit.

9. The non-transitory computer-readable media of claim 1, wherein the instructions further cause the device to:

implement a timeout mechanism for participant responses; and abort the transaction if a participant fails to respond within a specified time frame.

10. The non-transitory computer-readable media of claim 1, wherein:

the first participant and the second participant are services in a distributed database system; and the transaction-related data includes database changes prepared by the first participant.

11. The non-transitory computer-readable media of claim 1, wherein the instructions further cause the device to implement access control mechanisms to ensure that only authorized participants can retrieve transaction-related data using the transaction identifier.

12. The non-transitory computer-readable media of claim 1, wherein the preparation stage of the second participant includes validating the retrieved transaction-related data and preparing local changes based on the validated data.

13. The non-transitory computer-readable media of claim 1, wherein the instructions further cause the device to:

maintain multiple versions of data corresponding to different ongoing transactions; and provide access to a specific version based on the transaction identifier included in data retrieval requests.

14. The non-transitory computer-readable media of claim 1, wherein:

the confirmation message sent from the first participant to other participants includes metadata about prepared changes; and the second participant uses this metadata to determine whether to retrieve the transaction-related data.

15. The non-transitory computer-readable media of claim 1, wherein the instructions further cause the device to implement a rollback mechanism to revert changes if a participant fails after partial completion of the transaction.

16. The non-transitory computer-readable media of claim 15, wherein:

the rollback mechanism includes notifying all participants to undo their prepared changes; and each participant maintains a log of prepared changes to facilitate a rollback process.

17. The non-transitory computer-readable media of claim 1, wherein:

the two-phase commit protocol is implemented in a cloud computing environment; and the participants are distributed across multiple geographic regions.

18. The non-transitory computer-readable media of claim 1, wherein the instructions further cause the device to:

implement a priority-based preparation order for participants; and allow higher priority participants to prepare and vote before lower priority participants.

19. A method, comprising:

at a computer system:

initiate a two-phase commit protocol for a distributed transaction involving multiple participants;

receive, at a first participant, a prepare request from a coordinator;

send, from the first participant to other participants, a confirmation message indicating completion of a preparation stage;

receive, at a second participant, the confirmation message from the first participant;

in response to receiving the confirmation message, retrieve, by the second participant, transaction-related data from the first participant using a transaction identifier;

complete, by the second participant, a preparation stage using the retrieved transaction-related data; and send, from the second participant to the coordinator, a vote indicating readiness to commit the transaction.

20. A system, comprising:

a non-transitory memory storing instructions; and one or more processors in communication with the non-transitory memory that execute the instructions to:

initiate a two-phase commit protocol for a distributed transaction involving multiple participants;

receive, at a first participant, a prepare request from a coordinator;

send, from the first participant to other participants, a confirmation message indicating completion of a preparation stage;

receive, at a second participant, the confirmation message from the first participant;

in response to receiving the confirmation message, retrieve, by the second participant, transaction-related data from the first participant using a transaction identifier;

complete, by the second participant, a preparation stage using the retrieved transaction-related data; and send, from the second participant to the coordinator, a vote indicating readiness to commit the transaction.

* * * * *